United States Patent [19]

Merian et al.

[11] 4,347,173

[45] Aug. 31, 1982

[54] OPAQUE BLACK DYE FOR COLOR CODING OF WIRE ENAMELS, VARNISHES AND SYNTHETIC RESINS

[75] Inventors: Jacques S. Merian; Gerald J. Schiller, both of Pittsburgh, Pa.

[73] Assignee: Westinghouse Electric Corp., Pittsburgh, Pa.

[21] Appl. No.: 156,962

[22] Filed: Jun. 6, 1980

[51] Int. Cl.$^3$ .............................................. C08L 77/06
[52] U.S. Cl. ................................ 524/88; 106/308 M; 428/379; 524/110; 524/190
[58] Field of Search ..................... 260/46 R, 38, 37 N, 260/37 R; 106/308 M, 241; 428/379

[56] References Cited

U.S. PATENT DOCUMENTS 2,348,536  5/1944  Gordon .................................. 172/36
3,594,228  7/1971  Mock .................................. 117/231

Primary Examiner—Theodore E. Pertilla
Attorney, Agent, or Firm—R. D. Fuerle

[57] ABSTRACT

Disclosed is an opaque black dye which can be used to color wire enamels, varnishes and resins. The dye is a mixture of a blue dye and a red dye. The blue dye is a phthalocyanine, preferably a copper phthalocyanine and the red dye is a mixture of a rhodamine dye and a chromium complex.

12 Claims, No Drawings

OPAQUE BLACK DYE FOR COLOR CODING OF WIRE ENAMELS, VARNISHES AND SYNTHETIC RESINS

BACKGROUND OF THE INVENTION

Many customers for insulated wire desire to have the wire insulated with a variety of colors to facilitate tracing electrical connections in a complex circuit. While it is possible to color insulation with virtually any color, until now it has not been possible to obtain a solid black color. When black pigments were tried, which are insoluble in the wire enamel, they interfered with the electrical properties of the coating and did not coat properly. Black dyes, on the other hand, which are soluble in the wire enamel, are either transparent or translucent and are therefore aesthetically unacceptable. Many commerical black dyes have a bluish color when mixed with wire enamels, and when greater quantities are used, the wire enamel loses flexibility, heat shock, and electrical insulating properties.

SUMMARY OF THE INVENTION

We have discovered that an opaque black dye for wire enamels, varnishes, and synthetic resins can be produced by mxing a red dye and a blue dye. We do not known why a red dye and a blue dye produce a black dye or why the dye is totally opaque. The black dye of this invention can be included in various wire enamels, varnishes, and synthetic resins without affecting their electrical or physical properties. Only a small amount of dye is required and it is easy to include it in the compositions. The dye is inexpensive and can withstand the curing temperatures required for the different synthetic resins.

PRIOR ART

U.S. Pat. No. 2,348,536 discloses electrical insulating compositions containing polyamides and suitable dyes. The composition can be used to insulate wires and may be produced in a transparent or light-color form as well as a dark-color form.

U.S. Pat. No. 3,596,228 discloses the coloring of sheathed continuous strands such as fibrous insulated wires and cables. The strands are first coated with an insulating composition followed by a coloring of the outer surface of the insulation with a dye.

DESCRIPTION OF THE INVENTION

The dye of this invention may be added to any type of wire enamel, varnish, or synthetic resin. Particularly preferred are polyester amide-imides such as those disclosed in U.S. Pat. Nos. 3,555,113 and 3,652,471, herein incorporated by reference.

The black dye of this invention is a mixture of a red dye and blue dye. Dyes are distinguished from pigments in that they are soluble in the wire enamel, varnish, or synthetic resin, while pigments are not.

The blue dye according to this invention is a phthalocyanine and is preferably a copper phthalocyanine as those compounds work very well. Other cyanines which can be used include magnesium, aluminum, chromium, nickel and iron phthalocyanines. A phthalocyanine has the general formula:

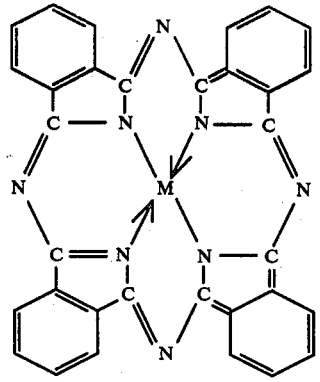

where M is a metal such as copper, magnesium, aluminum, chromium, nickel, or iron. The particular copper phthalocyanine which is preferred has the following structure:

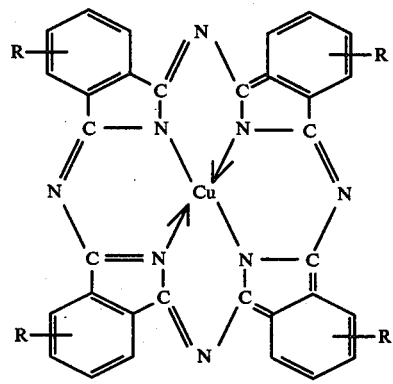

where R is $-SO_2NHCH_2CH_2CH_2CH(CH_3)_2$ or
$-SO_3N^+H_2CH_2CH_2CH_2CH_2CH(CH_3)_2$ That copper phthalocyanine is produced by converting copper phthalocyanine to its tetrasulfanilchlorine with chlorosulfonic acid followed by treatment with isohexylamine.

The red dye of this invention is preferably a mixture of a violet dye and yellow dye. The violet dye is preferably a rhodamine such as rhodamine B. These compounds are based on the general formula:

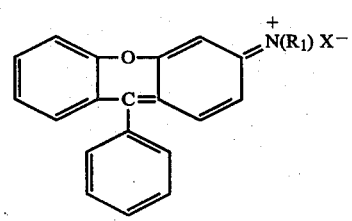

where $R_1$ is alkyl from $C_1$ to $C_6$ and $X^-$ is an anion, preferably halogen.

The particular rhodamine which is preferred has the structure:

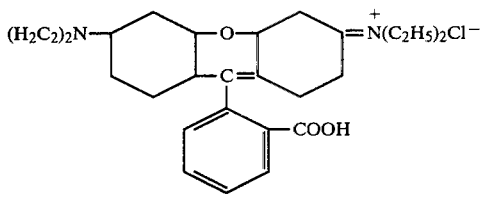

That rhodamine is produced by condensing metadiethylaminophenol with phthalic anhydride followed by the reaction of 3',6'-dichlorofluoran with diethylamine under pressure.

The yellow dye is preferably a chromium complex containing one atom of chromium for each molecule of a monoazo dye. It incorporates the general formula:

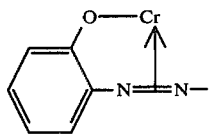

The preferred chromium complex has the general formula:

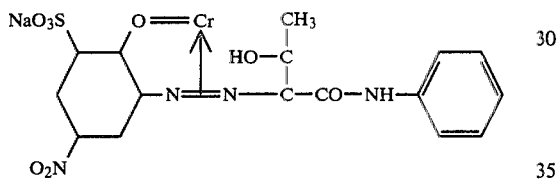

The above compound is produced by reacting 6-amino-4-nitro-1-phenol-2-sulfonic acid with acetoacetanilide followed by heating with an aqueous solution of chromium fluoride. About 5 to about 95% of the yellow dye may be mixed with about 5 to about 95% by weight of the red dye. Preferably, about 40 to about 60% of the yellow dye is mixed with about 40 to about 60% of the violet dye.

The blue dye can be mixed with the red dye in a weight ratio of about 1:1 to about 3:1 and an especially preferred ratio is 2:1. The total amount of dye in the wire enamel, varnish, or synthetic resin is preferably about 1 to about 4% by weight.

The following examples further illustrate this invention.

EXAMPLE 1

The resin used in this example is a polyester amide-imide described in U.S. Pat. No. 3,555,113. The wire enamel had 28% solids where the solvent was 70% cresylic acid and 30% Solvesso 100. The red dye was supplied by Verona Company under the designation Spirit Fast Brilliant Red B. The blue dye was supplied by BASF Wyandotte Corporation under the designation Spirit Soluble Fast Blue HFL. The ratio of blue dye to red dye was 2:1 and the dye constituted 3.75% by weight of the total solids. An 18 AWG copper wire was passed through the wire enamel which did not contain the dye, then through a tower heated at 350° to 800° F. for 30 to 45 seconds. Four additional passes were made with the undyed wire enamel followed by a single pass through the dyed wire enamel. The film thickness of the dyed overcoat was approximately 0.15 to 0.25 mils. The wire was an opaque jet black color.

EXAMPLE 2

In this Example an alkyd modified phenolic resin was used at 60% solids in a solvent which was 100% xylol. The same ratios and concentrations were used except that the red dye was supplied by BASF Wyandotte Corporation as Spirit Soluble Fast Fiery Red B. A copper strip 2" wide was dipped into the varnish and was baked in a 150° C. oven for 10 minutes. The film thickness was 0.5 to 1.0 mils and the coating was an opaque jet black color. Tests of the electrical properties of the film showed no deterioration compared with an undyed film.

We claim:

1. An organic wire enamel, varnish, or synthetic resin containing a phthalocyanine blue dye and a red dye which is a mixture of a rhodamine violet dye and a monoazo chromium complex yellow dye.

2. An organic wire enamel, varnish, or synthetic resin according to claim 1, wherein the blue dye has the general formula:

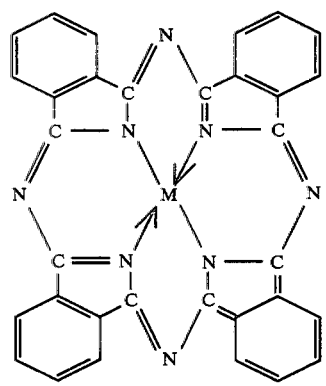

where M is copper, magnesium, aluminum, chromium, nickel or iron.

3. An organic wire enamel, varnish, or resin according to claim 2 wherein M is copper.

4. An organic wire enamel, varnish, or synthetic resin according to claim 3, wherein said blue dye has the general formula:

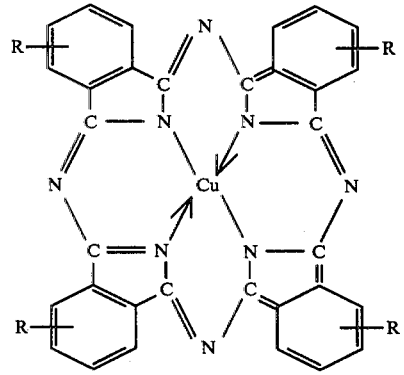

where R is $—SO_2NHCH_2CH_2CH_2CH(CH_3)_2$, $SO_3—N^+H_2CH_2CH_2CH_2CH(CH_3)_2$, or synthetic mixtures thereof.

5. An organic wire enamel, varnish, or synthetic resin according to claim 4, wherein said violet dye has the general formula:

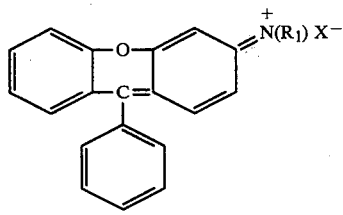

where $R_1$ is alkyl from $C_1$ to $C_6$ and $X^-$ is an anion, and said yellow dye has the general formula:

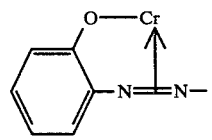

6. An organic wire enamel, varnish, or synthetic resin according to claim 5, wherein said violet dye has the formula:

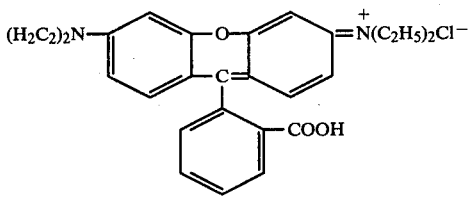

and said yellow dye has the general formula:

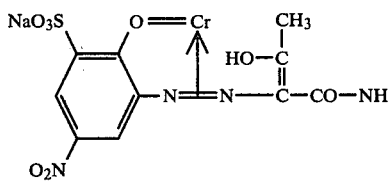

7. A method of coloring an organic wire enamel, varnish, or synthetic resin an opaque jet black color comprising adding thereto a mixture of a phthalocyanine blue dye and a red dye which is a mixture of a rhodamine violet dye and a monoazo chromium complex yellow dye.

8. An organic wire enamel, varnish, or resin according to claim 1 wherein the weight ratio of said blue dye to said red dye is about 1:1 to about 3:1.

9. An organic wire enamel, varnish, or resin according to claim 1, which contains about 1% to about 4% dye.

10. An organic wire enamel, varnish, or resin according to claim 1 wherein said red dye is about 40% to about 60% yellow dye and about 40% to about 60% violet dye.

11. An organic wire enamel, varnish or synthetic resin according to claim 1 wherein said wire enamel, varnish, or synthetic resin is a polyester-amide-imide.

12. An organic wire enamel, varnish, or synthetic resin according to claim 1 wherein said wire enamel, varnish, or synthetic resin is an alkyd modified phenolic resin.

* * * * *